Jan. 10, 1956 H. SCHMALE 2,729,901
HYDRAULICALLY ACTUATED TRACTOR SCRAPER
Filed Nov. 20, 1951 3 Sheets-Sheet 1
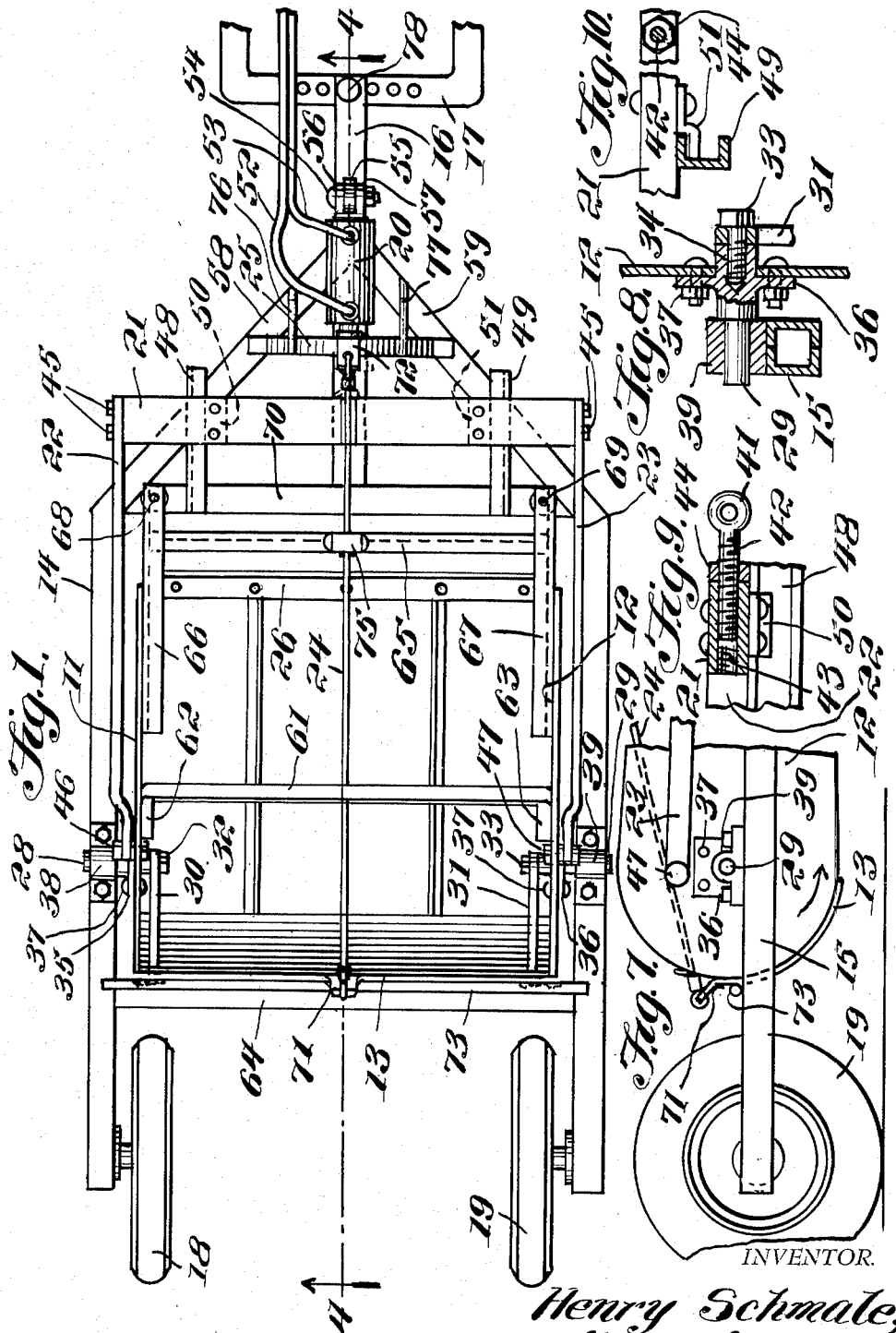
INVENTOR.
Henry Schmale,
BY Victor J. Evans & Co.
ATTORNEYS

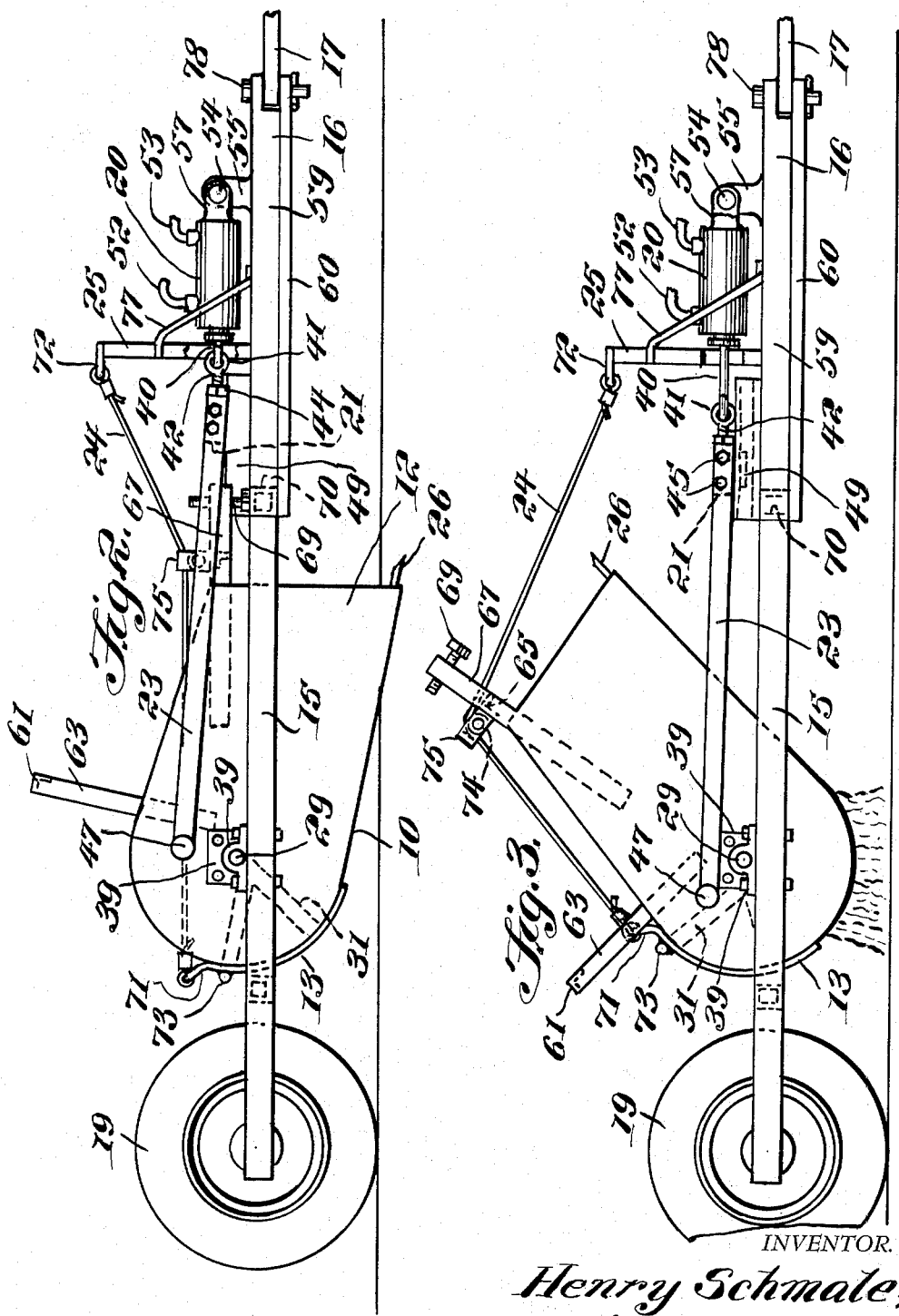

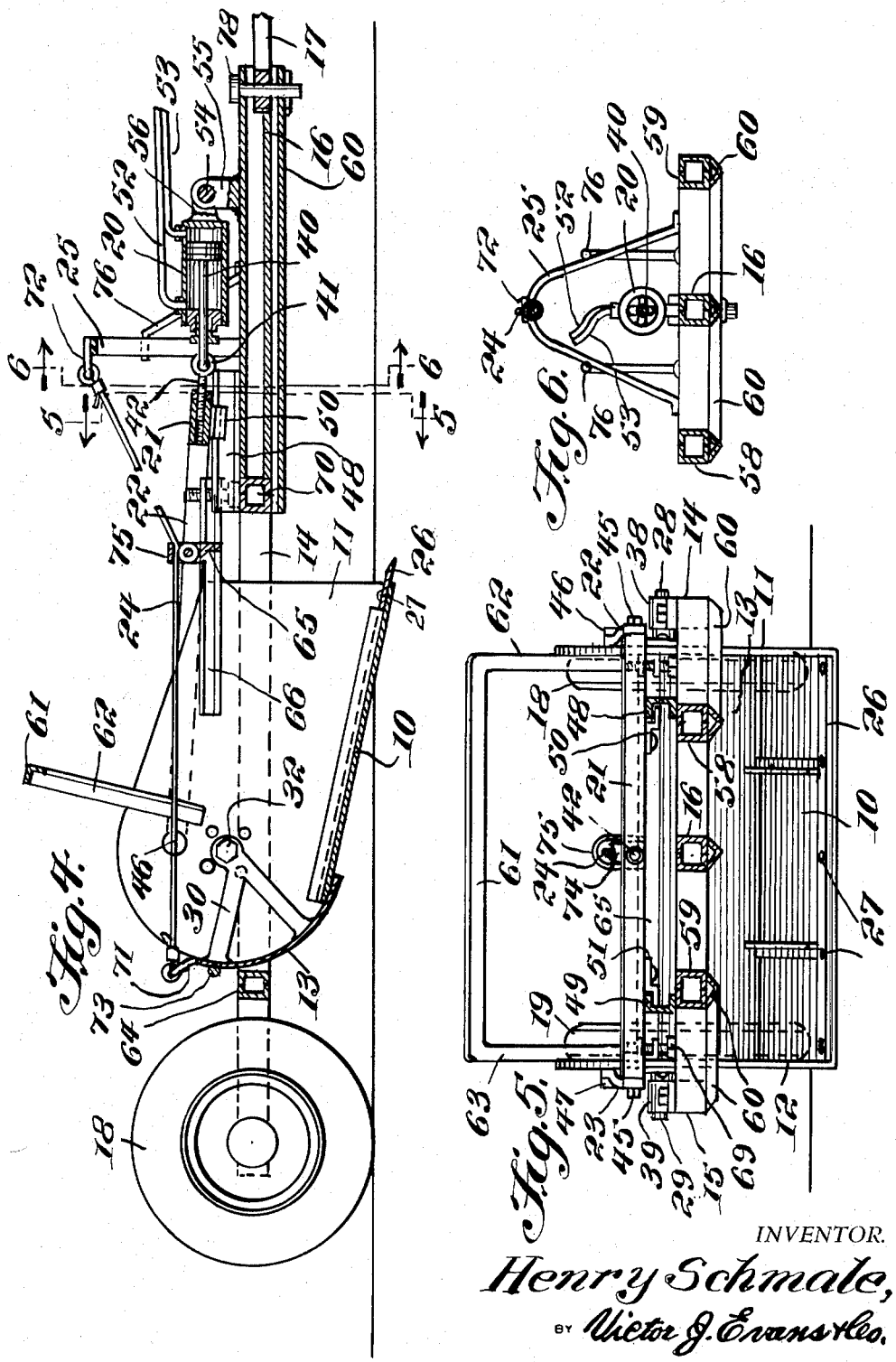

United States Patent Office 2,729,901
Patented Jan. 10, 1956

2,729,901

HYDRAULICALLY ACTUATED TRACTOR SCRAPER

Henry Schmale, Thornton, Iowa

Application November 20, 1951, Serial No. 257,305

1 Claim. (Cl. 37—133)

This invention relates to tractor drawn earth moving equipment and in particular a hydraulically actuated scraper or scoop wherein a pivotally mounted scoop with a scraper blade on the forward edge and a gate pivotally mounted at the rear is actuated to a dumping position with a hydraulic cylinder, wherein the gate is automatically opened by a cable as the scoop arrives at the dumping position, and wherein the scoop is returned to a scraping position by the same hydraulic cylinder.

The purpose of this invention is to provide means for mounting and operating a scoop for scraping and transporting earth whereby the scoop is actuated to scraping, transporting and dumping positions by an operator positioned on a tractor to which the scoop is attached.

Various types of earth moving scoops have been provided, however, where scoops are drawn by tractors it is difficult to connect the scoop to the tractor so that the scoop may be actuated by an operator positioned on the seat of the tractor. With this thought in mind this invention contemplates a method of mounting a scoop on a horizontally disposed frame and also means for connecting the scoop to operating elements whereby the scoop is retained in an operative or scraping position by applying fluid pressure to one end of a hydraulic cylinder and to transporting and dumping position by applying fluid under pressure to the opposite end of the cylinder.

The object of this invention is, therefore, to provide an improved mounting for earth moving scoops whereby the scoop may readily be connected to and actuated by a hydraulic cylinder positioned on a frame on which the scoop is mounted.

Another object of the invention is to provide means for opening a gate at one end of a scoop as the scoop is actuated to a dumping position by a hydraulic cylinder.

A further object of the invention is to provide an earth moving scoop mounted on a horizontally disposed frame with a hydraulic cylinder for actuating the scoop from scraping to transporting and dumping positions and with a cable for opening a gate at one end of the scoop as the scoop is actuated to a dumping position, in which the scoop and mounting elements thereof are of comparatively simple and economical construction.

With these and other objects and advantages in view the invention embodies a horizontally disposed mounting frame having supporting wheels at the rear and means for attaching the forward end to the draw bar of a tractor, a scoop having a blade on the forward end and a pivotally mounted gate at the rear journaled on the frame, a hydraulic cylinder operatively connected to the scoop, and a cable extended from a stationary post on the frame to the gate for opening the gate as the scoop is actuated to a dumping position.

Other features and advantages of the invention will appear from the following description taken in connection with the drawings, wherein:

Figure 1 is a plan view illustrating the scoop with the parts in the scraping position.

Figure 2 is a side elevational view of the scoop with the parts as shown in Figure 1.

Figure 3 is a similar view showing the scoop in the dumping position.

Figure 4 is a longitudinal section through the device taken on line 4—4 of Figure 1.

Figure 5 is a cross section through the device taken on line 5—5 of Figure 4.

Figure 6 is also a cross section through the device taken on line 6—6 of Figure 4.

Figure 7 is a detail showing a part of a side elevational view illustrating a rod extended across the gate of the scoop for breaking the gate to start the opening movement thereof as the scoop is actuated from a scraping to a dumping position.

Figure 8 is a detail showing a section through one of the mounting bearings at the sides of the scoop showing the pivotal mounting of the scoop on the frame.

Figure 9 is a detail illustrating an adjustable connection between the piston rod of the hydraulic cylinder and a cross bar which is connected to the sides of the scoop.

Figure 10 is a fragmentary sectional view illustrating certain constructional details of the apparatus.

Referring now to the drawings wherein like reference characters denote corresponding parts the improved earth moving scoop of this invention includes a bucket or scoop having a base plate 10 with side walls 11 and 12 and a gate 13, a horizontally disposed frame having side beams 14 and 15 with a tongue 16 for connecting the frame to a draw-bar 17 of a tractor and with the rear ends of the beams mounted on wheels 18 and 19, a hydraulic cylinder 20 mounted on the frame for actuating the scoop through a cross bar 21 mounted on the frame, side bars 22 and 23, and a cable 24 that extends from a stationary post 25 mounted on the frame to the gate 13.

The open or forward end of the scoop is provided with a scraper blade 26 which is secured in position with rivets or screws 27 and the ends of the side walls 11 and 12 of the scoop at the rear or trailing end thereof are substantially semi-circular, being formed on a radius from the axis of stub shafts 28 and 29 on which the gate 13 is pivotally mounted whereby the gate follows the edges of the side walls of the scoop.

The arcuate gate 13 is provided with arms 30 and 31 which are pivotally mounted by cap screws 32 and 33 threaded in sockets 34 in the inner ends of the stub shafts. The arms 30 and 31 lie inside of the walls 11 and 12. The stub shafts are provided with flanges 35 and 36 which are secured by bolts 37 through the side walls 11 and 12 of the scoop, respectively, as illustrated in Figure 8. The ends of the stub shafts are journaled in bearings 38 and 39 on the side beams 14 and 15 of the frame.

The scoop is actuated by the hydraulic cylinder 20, the piston rod 40 of which is connected to an eye 41 of a threaded stud 42 that is threaded in an opening 43 of the cross bar 21, as shown in Figure 9, and the stud is secured in adjusted positions with a lock nut 44. The side bars 22 and 23 are secured to the ends of the cross bar 21 by bolts 45 and the extended offset ends of the side bars are pivotally connected to the outside of side walls 11 and 12, respectively, of the scoop by bolts 46 and 47.

The U-shape frame including the cross bar 21 and side bars 22 and 23 travels on rails 48 and 49 and is held in position with clips 50 and 51 on the under surface of the cross bar 21.

With the parts arranged in this manner pressure applied to the rear end of the hydraulic cylinder 20 through the connection 52 draws arms 22 and 23 forwardly whereby the scraper 26 is moved downwardly to the position shown in Figure 4 and as pressure is applied to the opposite end of the cylinder through the connection 53 the arms 22 and 23 are moved rearwardly whereby the scoop is actuated to the position shown in Figure 3.

The forward end of the cylinder 20 is pivotally mounted by a pin 54 on a projection 55 extended upwardly from the tongue 16, the pin 54 extending through spaced extensions 56 and 57 on the end of the cylinder.

The tongue 16 is connected to the forward ends of the side beams 14 and 15 with diagonally positioned sections 58 and 59 and the sections 58 and 59 may be welded to the beams 14 and 15. The tongue and sections 58 and 59 are formed with V-shaped surfaces, as indicated by the numeral 60 (Figure 5) on the under surfaces.

A U-shaped frame formed with a cross bar 61 and side arms 62 and 63, is secured, preferably by welding to the side walls 11 and 12 of the scoop and with the frame positioned as shown the cross bar 61 selectively engages a cross beam 64 on the frame thereby providing a stop limiting the turning movement of the scoop.

A similar U-shaped frame formed with a cross bar 65 and arms 66 and 67 extends from the open or forward end of the scoop and bolts 68 and 69, threaded in the ends of the arms 66 and 67 are positioned to engage a cross bar 70 of the frame to limit downward movement of the scoop as the scoop is adjusted to the scraping position shown in Figure 4.

The gate 13 is provided with an eye 71 to which one end of the cable 24 is connected and with the opposite end of the cable connected to an eye 72 on the post 25. The cable 24 draws the gate 13 from the position shown in Figure 4 to that shown in Figure 3 as the scoop is turned from the position shown in Figure 4 to that shown in Figure 3. The gate is also provided with a cross bar 73, the ends of which are positioned to at times engage the side beams 14 and 15 of the frame as the turning movement of the scoop starts whereby the gate is started in the opening movement and after the starting movement of the gate the cable 24 draws the gate to the open position. The cable 24 is trained over a pulley 74 in a frame 75 on the cross bar 65, and extended between the arms 66 and 67.

The vertically disposed post 25 is preferably formed, as shown in Figure 6, wherein sloping side members are supported by braces 76 and 77.

The forward end of the tongue 16 is provided with a bolt 78, similar to a king pin and which is adapted to extend through the draw bar 17 of a tractor for attaching the frame to a tractor.

With the parts positioned and mounted in this manner the earth moving device may be attached to a tractor and with the parts in the position shown in Figures 2 and 4 the earth may be scraped upwardly into the bucket or scoop and after the scoop is filled it is rotated slightly so that it will retain earth therein for transportation and with additional pressure applied to the forward end of the hydraulic cylinder the scoop may be actuated to the position shown in Figure 3 for dumping.

It will be understood that modifications may be made in the design and arrangement of the parts without departing from the spirit of the invention.

What is claimed is:

A hydraulically actuated tractor scraper, comprising a scoop including a base plate, side walls secured to said base plate, a gate hingedly connected to said side walls, a horizontally disposed frame including side beams, a tongue extending forwardly from said frame, wheels connected to the rear ends of said beams, a horizontally disposed cylinder for actuating said scoop, the front end of said scoop being open and provided with a scraper blade, the rear ends of said side walls being substantially semi-circular in shape, arms extending forwardly from said gate, stub shafts connected to said arms and journaled on said beams, a piston rod projecting rearwardly from said cylinder, a crossbar connected to said rod and having its ends secured to the side walls of said scoop, a projection extending upwardly from said tongue, a pin pivotally connecting the front end of said cylinder to said projection, diagonally positioned sections connecting the front ends of said side beams to said tongue, stop members for limiting turning movement of said scoop, an eye on said gate, a vertically disposed post projecting upwardly from said frame, a cable having one end connected to said post and its other end connected to the eye on said gate, sloping side members extending between said post and diagonally positioned sections, and a crossbar connected to said gate for engagement with the side beams of said frame.

References Cited in the file of this patent

UNITED STATES PATENTS

| 1,901,485 | Wirt | Mar. 14, 1933 |
| 2,293,636 | Berner et al. | Aug. 18, 1942 |
| 2,308,534 | Paulsen | Jan. 19, 1943 |
| 2,408,806 | Mork | Oct. 8, 1946 |
| 2,445,260 | Brimhall | July 13, 1948 |
| 2,581,073 | Brower | Jan. 1, 1952 |

FOREIGN PATENTS

| 119,871 | Australia | Apr. 24, 1945 |
| 818,483 | France | June 21, 1937 |